United States Patent
Snyder et al.

(10) Patent No.: US 6,760,870 B1
(45) Date of Patent: Jul. 6, 2004

(54) ALGORITHM FOR RESYNCHRONIZING A BIT-SLICED CROSSBAR

(75) Inventors: Robert D. Snyder, Ouistreham (FR); Benjamin Dodge, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/563,007

(22) Filed: Apr. 29, 2000

(51) Int. Cl.[7] .............................................. G01R 31/28
(52) U.S. Cl. ...................... 714/712; 370/386; 710/317; 712/33
(58) Field of Search ............................. 714/30, 23, 712; 341/58; 370/386, 395.1, 351, 357, 388–389, 400, 408, 462; 340/146.1, 825.5, 2.1; 709/238, 200, 232, 230; 710/10, 15, 307, 305, 309–312, 316–317; 711/5, 171; 712/10, 16, 22, 11, 13, 29, 43, 33

(56) References Cited

U.S. PATENT DOCUMENTS

| | | | |
|---|---|---|---|
| 5,444,705 A | * | 8/1995 | Olnowich et al. .......... 370/388 |
| 5,463,486 A | * | 10/1995 | Stevens ........................ 398/45 |
| 5,487,146 A | * | 1/1996 | Guttag et al. ............... 345/519 |

* cited by examiner

Primary Examiner—Guy J. Lamarre

(57) ABSTRACT

A data switch is configured to communicate data messages in the form of multibit data unit segmented into a plurality of multibit data subunits. The data switch includes at least two separate, parallel switching units, each having a plurality of ports to communicate the multibit data subunits. Hardwired or software implemented prioritization logic provides for the initiations of transfer of data messages between the ports in response to a category of the data messages. A memory is used to store a history of prior data message transfers so that least recently transferred message types are serviced prior to those most recently switched. So as to reestablish synchronization between the parallel switching units, such as loss of a data subunit, a controller responds to a reset condition by temporarily suspending communications between affected ones of the ports and clearing the history so to recommence lock-step operations of the units.

22 Claims, 4 Drawing Sheets

ALGORITHM FOR RESYNCHRONIZING A BIT-SLICED CROSSBAR

BACKGROUND

Multiprocessor systems require some form of connectivity to exchange data and control messages. This information can be transferred between cells through the use of crossbars or interconnect fabric in several different ways. One method involves the transfer of the information sequentially from one cell to a second cell via a crossbar providing a single path through its connectivity fabric at a time. This methodology of making a single path available provides a low interconnect bandwidth through the crossbar. Alternatively, if more than one connection or crossbar connection between the cells is available the time required to transfer the information between two cells can be reduced by bit-slicing the data to be transferred. Bit-slicing basically breaks the data up into various packets and these packets are routed between one of the two interconnections between the cells. For instance, if two crossbars are available, the information to be transferred between cell 1 and cell 2 can be broken up into two different packets. Packet 1 can traverse from cell 1 to cell 2 via crossbar A and Packet 2 can traverse from cell 1 to cell 2 via crossbar B. The use of bit-slicing decreases the amount of time necessary for the information to be transferred from cell 1 to cell 2 and thus increases the interconnect bandwidth.

In order to ensure the proper information is sent, the messages sent via crossbar A and crossbar B must be appropriately recombined in the proper sequence within cell 2. One method to assure that this information is combined correctly within cell 2, is to have crossbar A and crossbar B in lock step while they transfer the information between cell 1 to cell 2. This lock step between the crossbars assures the two messages are synchronized upon arrival at cell 2. Problems arise, moreover, if an error occurs in either crossbar A or crossbar B during this lock step or synchronization.

When an error is present, and the synchronization between crossbar A and crossbar B is destroyed, so that the synchronization must be reacquired prior to the subsequent transfer of data. One method of reacquiring synchronization between crossbar A and crossbar B is to require a full chip reset to reacquire the synchronization. A full chip reset would terminate all transactions in progress throughout the affected crossbars. Further, resetting the crossbar may disrupt other connections through the device.

A second method for reacquiring the synchronization is through the use of dedicated pins on crossbar A and crossbar B. By supplying a reset to the dedicated pins at the same time to both crossbar A and crossbar B synchronization can be reacquired. However, the use of dedicated pins impacts both chip pin count and the performance in terms of latency. This latency impact is a result of the time required to exchange information between the two crossbars. Further, resetting the crossbar may disrupt other connections through the device.

When cells attempt to send multiple messages to another cell at approximately the same time, a crossbar must determine the order of the messages which are accepted and sent. Typically crossbars implement an arbitration algorithm which selects among the messages which compete with each other for access to system resources according to resource availability. Ports are used to connect cells to the crossbar, and the arbitration algorithm helps to determine the sequence of messages received through a specific port. One example of an arbitration algorithm uses the history of previous arbitrations to decide which messages should be sent next, i.e., which messages receive priority service. Arbitrations which depend on previous decisions present their own special difficulties. When resynchronization affects arbitration algorithms which normally depend on previously made decisions, priorities are lost when previous history is also reset and erased. Alternative algorithms may present fairness complexities.

Accordingly, a need exists for a method and system which provides the transfer of data from cell 1 to cell 2 with a high interconnect bandwidth. A further need exists for a method and system that reacquires synchronization on a portion of the crossbar or intercommunications fabric that has lost synchronization between complimenting crossbars, without requiring resynchronization of every port on the crossbar. A further need exists which will allow resynchronization among crossbar elements that use arbitration algorithms.

SUMMARY OF THE INVENTION

These and other objects, features and technical advantages are achieved by a system and method which according to an aspect of the invention, a data switch is configured to communicate data messages in the form of multibit data units segmented into a plurality of multibit data subunits. The data switch includes at least two separate, parallel switching units, each having a plurality of ports to communicate the multibit data subunits. Hardwired or software implemented prioritization logic provides for the initiations of transfer of data messages between the ports in response to a category of the data messages. A memory is used to store a history of prior data message transfers so that least recently transferred message types are serviced prior to those most recently switched. So as to reestablish synchronization between the parallel switching units, a controller responds to a reset condition by temporarily suspending communications between affected ones of the ports and clearing the history to recommence a lock-step operation of the units.

According to another aspect of the invention, a processing system includes plural processing cells, each including a controller configured to communicate data messages in discrete, multibit data units. Each of the data units are segmented into plural multibit data subunits for parallel transmission to and from the controller over respective distinct transmission paths. The controller recombines the received data subunits back into a corresponding one of the multibit data units and identifies any error condition caused by a nonreceipt of one of the subunits required to complete a corresponding one of the multibit data units. A switch includes two or more switching units preferably in the form of crossbars. Each switching unit has a plurality of ports connected by the distinct transmission paths to respective ones of the controllers to communicate the multibit data subunits with the processing cells. The switch responds to the error condition by initiating a resynchronization procedure to reestablish a lock-step condition between and among the switching units. This resynchronization procedure may include halting communications between affected ones of the ports and resetting a portion of the history relating to the affected ports.

According to a feature of the invention, the switch includes message prioritization logic to initiate a transfer of data messages between the ports in response to a category of the data messages. The prioritization logic responds to an order of message categories transfers completed for initiating a transfer of message categories least recently transferred prior to initiating a transfer of message categories most recently transferred. The switch may include a memory configured to maintain a history of the data messages, the message prioritization logic responsive to the history for initiation of the transfer of data messages between the ports. This history may include an indication of the categories of the data messages most recently transferred through the switch.

According to another feature of the invention, the prioritization logic is configured to initiate a transfer of a data message category least recently transferred prior to a data message category more recently transferred by the switch.

According to another feature of the invention, the ports corresponding to a respective one of the processing cells include error processing logic for detecting an error in the data messages. The logic may detect such conditions as a missing or incorrect subunit, and incomplete or invalid data unit, parity errors, category mismatches, etc.

According to another aspect of the invention, a method of communicating data messages segments multibit data units into a plurality of multibit data subunits. The data messages are categorized and a history of data message transfer is maintained. The history may be based on recency of transfer of the messages of particular categories. The method includes initiation of a transfer of the multibit data subunits over separate, parallel paths. In response to identification of an error, such as loss of one of the multibit data subunits, appropriate action is taken to desynchronize the data subunits. These actions may include suspending or inhibiting transfer of certain messages and resetting the history. Once reset, data transfers between affected ports may be reenabled so that communications may be continued with the data subunits in lock-step.

According to a feature of the invention, the step of initiating includes controlling a switch fabric to connect source and destination devices for communicating the multibit data subunits over separate parallel paths.

According to another feature of the invention, a method further includes a step of ordering the categories of data messages transferred so that initiation of a transfer of message categories least recently transferred is performed prior to initiating a transfer of message categories most recently transferred.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
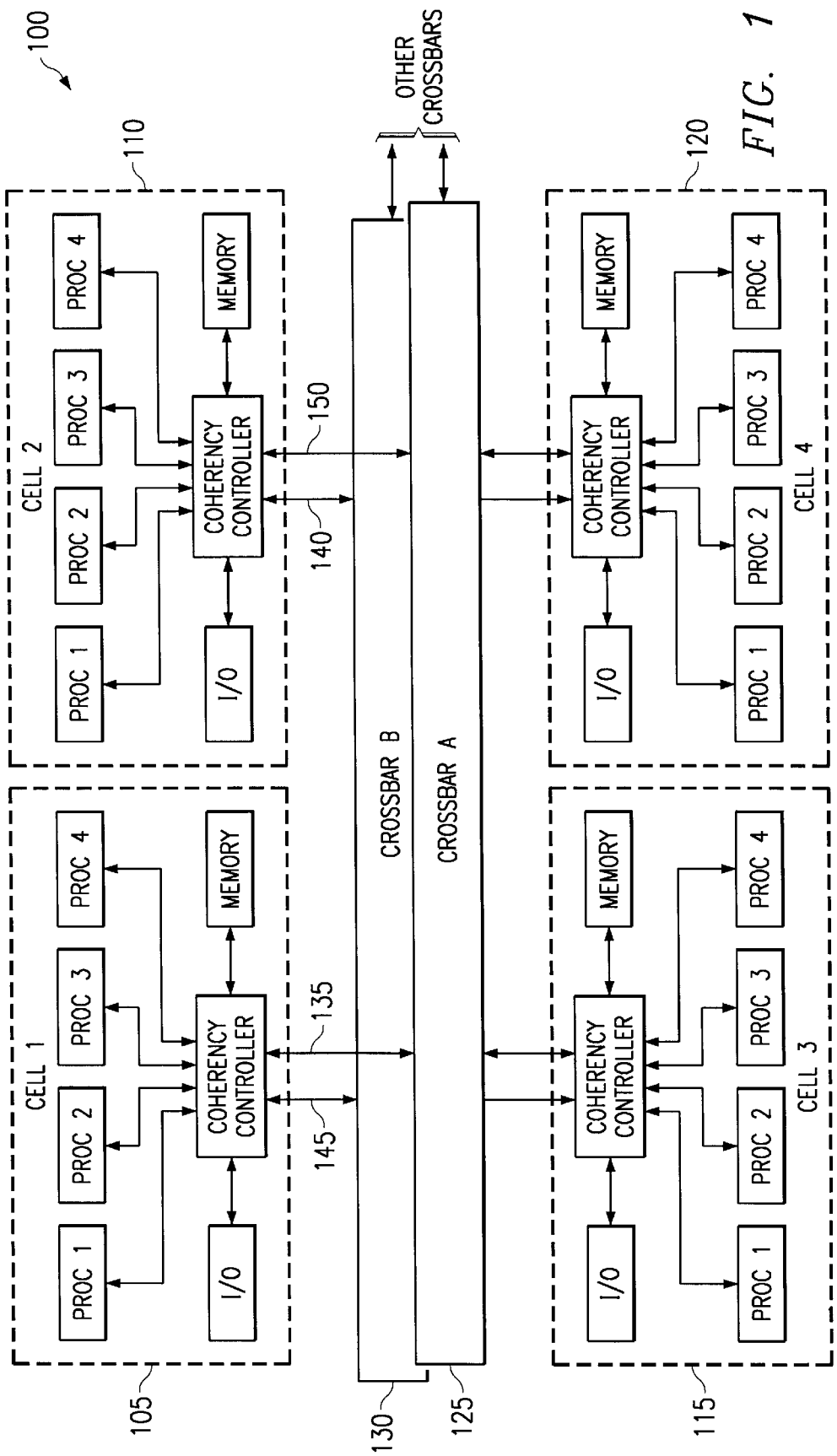
FIG. 1 is a block diagram of a node consisting of four cells and an interconnect fabric.

FIG. 1 is a block diagram of a multiprocessor, multicelled system 100. System 100 is composed of processing cells 105–120 and memory. The four cells communicate with, and, among each other through "ganged" crossbar 125 and 130, each routing one half of a 72 bit wide data transfer between cells. Cell 1 (105) can access cell 2 (110) through either crossbar 125 or crossbar 130. Similarly, cell 3 (115) can also access cell 2 (110) through either crossbar 125 or crossbar 130. If cell 1 (105) transmits information to cell 2 (110) the information is sent from cell 1's coherency controller through the link 135 to crossbar 125 and crossbar 130 through link 145. Then from crossbar 125 through link 150, crossbar 130 through link 140 to cell 2's coherency controller.

Bandwidth is improved through the use of bit-slicing which is used to divide the information between crossbar 125 and crossbar 130. For instance, cell 1 (105's) coherency controller can divide a message which consists of 72 bits into two 36 bit wide packets. The first 36 bit packet (i.e., upper order), packet A, can be sent via link 135 to crossbar 125 and via link 150 from crossbar 125 to cell 2 (110's) coherency controller. At the same time cell 1 (105's) coherency controller sends the second (i.e., lower order) 36 bits of the message in packet B across link 145 to crossbar 130 and across link 140 to the coherency controller of cell 2 (110). In this mannner, the length of time required to transmit the message is cut approximately in half in comparison to a sequential transmission through a single switch. The 36 bits which were transferred via crossbar 125 and the 36 bits transferred via crossbar 130 are merged within cell 2 (110's) coherency controller to reform the original message.

Figure 2A:
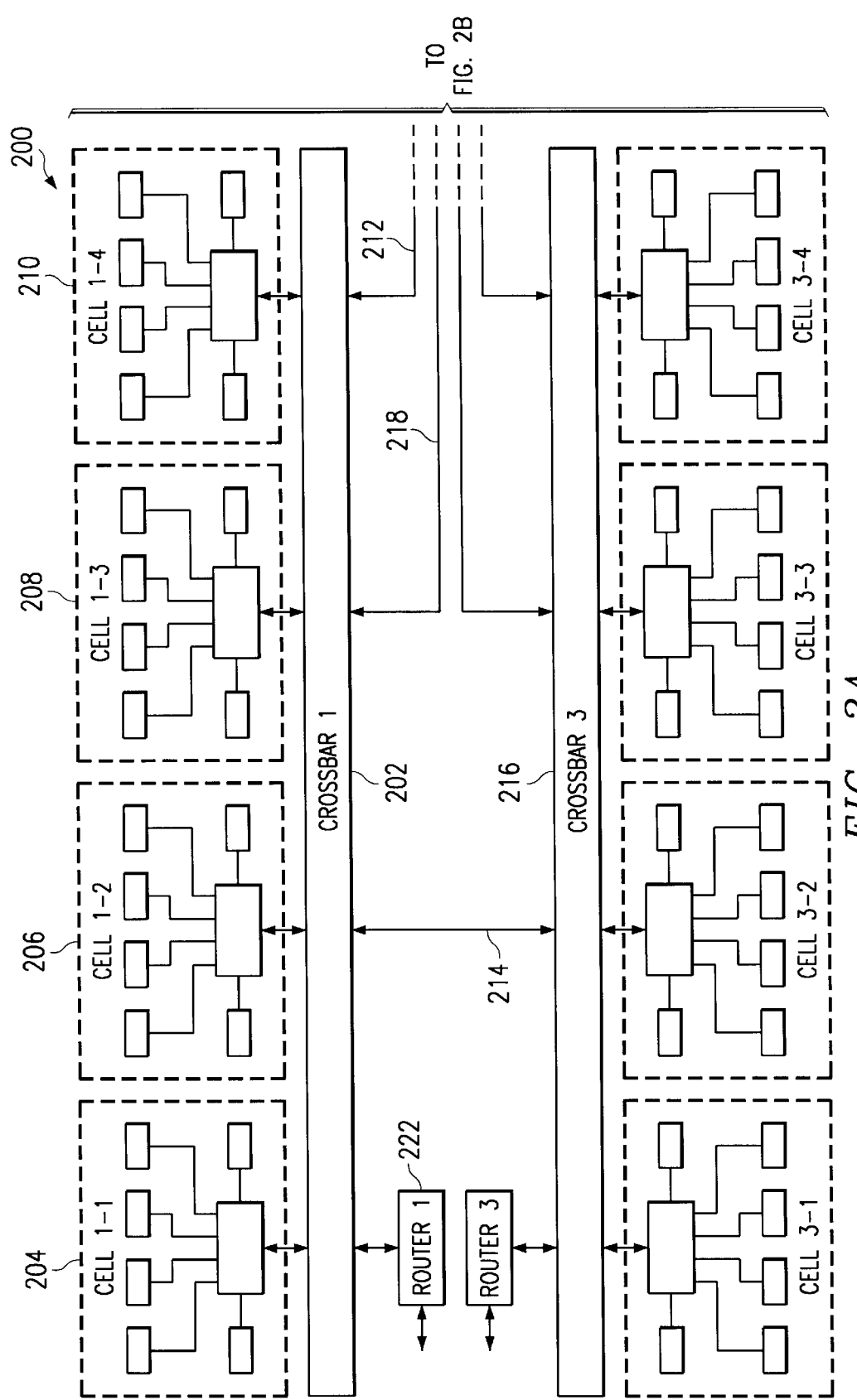
FIGS. 2A and 2B are block diagrams of four nodes consisting of four cells each and an interconnect fabric.
Figure 2B:
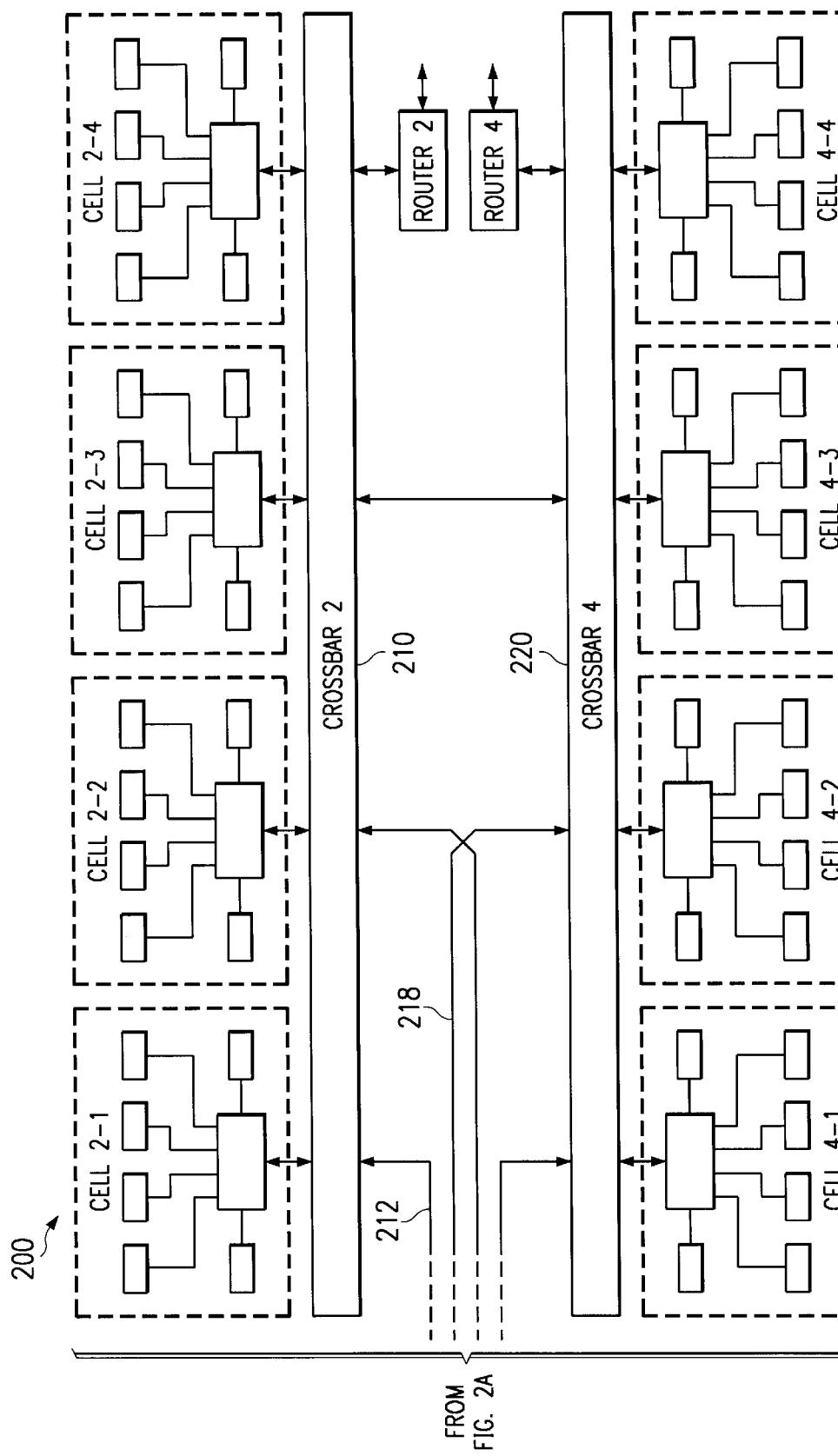

Referring to FIGS. 2A and 2B, each crossbar element can have up to eight connections. For instance, crossbar 202 uses four of its ports to connect to cells 204–210. Three of crossbar 202's remaining connections are used to connect to the other three crossbars of the four crossbar system. Link 212 connects crossbar 202 to crossbar 210, link 214 connects crossbar 202 to crossbar 216, and link 218 connects crossbar 202 to crossbar 220. Crossbar 202 also includes a port connecting to router 222 used to communicate with a similar system of crossbars and cells. Each of the crossbars 202, 210, 216 and 220 include two parallel, 36 bit wide crossbar switching units (not shown) to provide a combined 72 bit wide switching capability. Such an arrangement provides a bit sliced transfer of messages.

While both crossbar switching units operate synchronously with regard to a common clock signal, the units do not coordinate transfer of respective message portions or bit slices. Eliminating or avoiding intramessage coordination and synchronization between crossbar switching units avoids the associated processing delay. Since errors causing the crossbar switching units to desynchronize are rare, this time saving is preferable to synchronization overhead which would otherwise be required. However, in the event of loss of this "passive" synchronization, steps must be taken to recoordinate message handling so that complete 72 bit wide data transfers are accomplished.

For example, assume, as in the present embodiment of the invention, there are five classes of flow control messages that can be sent from a cell via a crossbar to the rest of the system. A first flow control is a read request, which requests access to memory located within a different cell. A second flow control class is a memory return used to respond to a read request in which information contained in a memory location is sent to the requesting processor. A third flow control class is a processor respond in which a specific processor located within a cell responds to a request from another processor. A fourth flow control class is an input/output (I/O) transaction, a read or write request, from an I/O card together with any associated interrupts. A fifth flow control class consists of crossbar interconnect networks for running system backup implemented as a fast fail-over mode or a hot standby.

In a preferred embodiment of the present invention, priorities are established between the various flow controls to ensure equal treatment between the flow controls. For instance, a read request should not be allowed to block a data return from memory. To provide for prioritization, five buffers in the form of a circular queue are established for each type of flow control within each port of a crossbar. In the preferred embodiment of the present invention, forty buffers are established, five for each flow control within each of the eight input ports of a crossbar.

Figure 3:
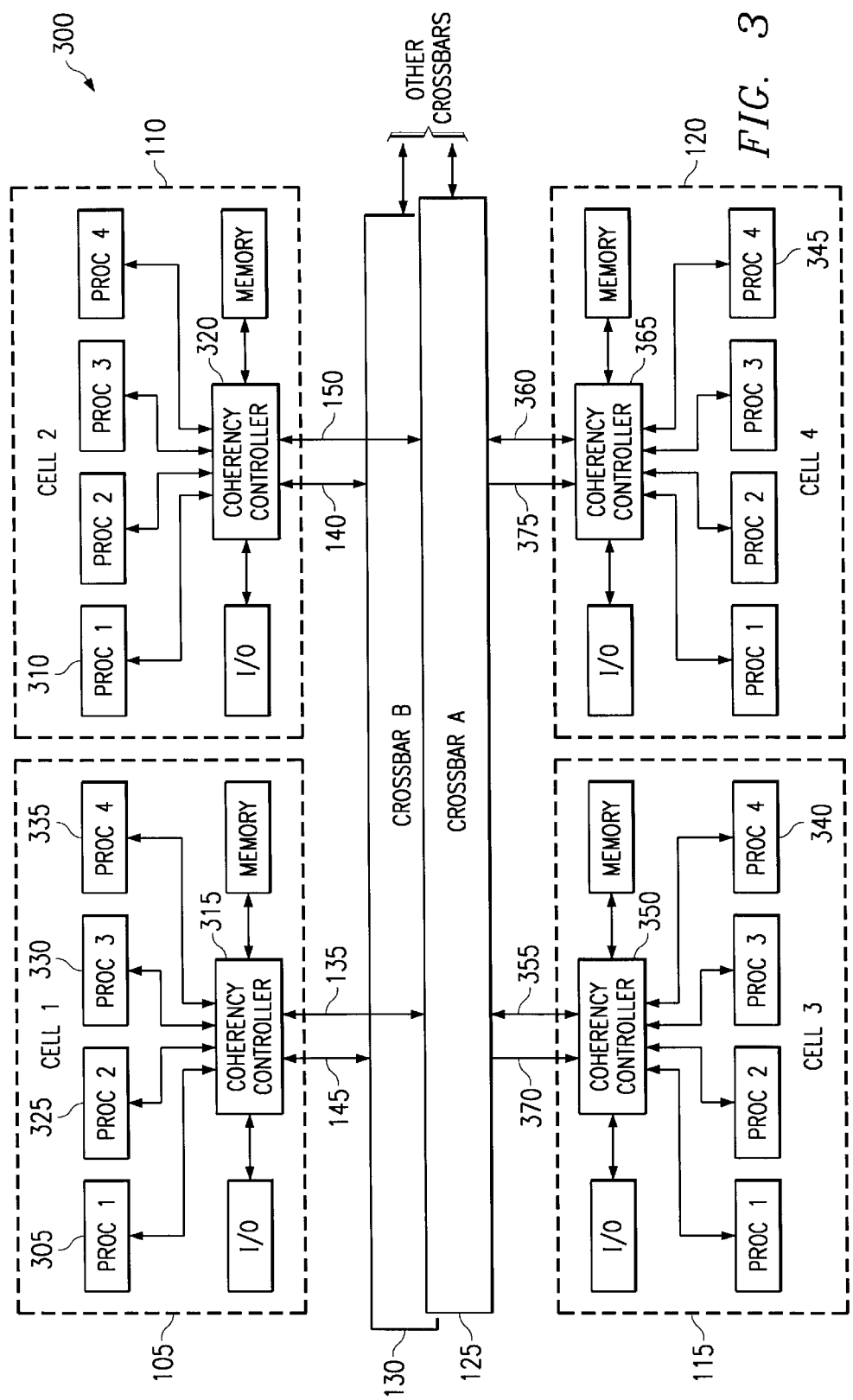
FIG. 3 is a block diagram showing the communication paths across the interconnet fabric between processors in different cells.

Referring now to FIG. 3, if processor 305 of cell 105 initiates communication with processor 310 of cell 110 communication messages are routed from processor 305 of cell 105 to the coherency controller 315 of cell 105. The coherency controller 315 bit-slices or divides the communication up into two parallel 36 bit packets. Packet A (not shown) is sent via link 135 to crossbar 125 and then via link 150 to coherency controller 320 of cell 110. In parallel, packet B, containing the second set of 36 bits, is sent from coherency controller 315 of cell 105 via link 145 to crossbar 130 and then via link 140 to coherency control 320 of Cell 110. In the transmission of this communication, crossbar 125 and crossbar 130 operate in lock step or, in synchronized mode based on having a common clock signal, i.e., are possibly synchronized. Upon receipt of both packet A and packet B coherency controller 320 of cell 110 reassembles the communication in the proper format and sends the information to processor 310 of cell 110. If an error occurs during the transmission of packet A or packet B via request crossbars 125 and crossbar 130, synchronization between crossbar 125 and crossbar 130 would be lost. The present invention relates to a method for reestablishing, the synchronization between crossbar 125 and crossbar 130. But, before the synchronization can be reestablished the error first has to be detected.

One situation in which an error can be detected is through parity checks performed by the crossbars. When packet A is sent from coherency controller 315 of cell 105, to crossbar 125, the latter performs a parity check to ensure that the received data survived the transmission without modification. If a single bit error occurs in the transmission of packet A from coherency controller 315 of cell 105 to the crossbar 125, by using duplicated data and parity bits, crossbar 125 can correct the changed bit to recover the original message. If, however, two or more bits have been corrupted in the transmission of packet A from coherency controller 315 of cell 105 to crossbar 125, the error is unrecoverable and therefore fatal. In the presence of a fatal error, crossbar 125 will not transmit packet A to coherency controller 320 of cell 110 via link 150.

Nearly simultaneously (i.e. substantially in parallel), coherency controller 315 of cell 105 transmits packet B over link 145 to crossbar 130. Crossbar 130 separately and independently performs a parity check on packet B upon receipt. In the absence of an error within packet B, crossbar 130 transmits packet B via link 140 to coherency controller 320 of cell 110. However, in trying to reformat the original message, coherency controller 320 will have received packet B but will not have received packet A and will therefore determine that an error has occurred in the transmission of packet A. Additionally, the presence of this error in packet A interrupts synchronization or lock step between the crossbars. This loss of synchronization between crossbar 125 and crossbar 130 is further exacerbated by the time delay associated with coherency controller 320 of cell 110's identification of the receipt of packet B without a corresponding packet A.

In the preferred embodiment of the invention, crossbar 125 and crossbar 130 can be resynchronized by reinitializing the link between crossbar 125 and cell 105 simultaneously, or nearly so, with the reinitialization of the link between crossbar 130 and cell 105. In addition to reinitializing the link between the crossbars and cell 105 the arbitration history must also be realigned. In order to realign the arbitration history the traffic between cell 105 and the two crossbars 125 and 130 must be stopped. Thereafter, the realignment of the arbitration can occur simultaneously with the reinitialization of the links between cell 105 and crossbar 125 and crossbar 130. This can be accomplished because competition for the resources for the links 135 and 145 has been halted. When all other traffic between cell 105 and the crossbars has been halted, there is no contention in the execution of the reinitialization command and other transmissions, so that there is only one contestant requesting the resource, the reinitialization command.

There are at least two ways in which the traffic can be halted between cell 105 and the crossbars. A first implementation is in software. Referring again to FIG. 3, cell 105 includes four processors, 305, 325, 330) and 335. Preferably, one of these processors will be designated a master or "monarch" processor. For example, if processor 305 of cell 105 is designated the monarch processor, the processor will include a software error handling routine to resolving transmission problems between cell 105 and the crossbars. Once an error has been detected, processor 305 (the monarch processor), sends a message to both crossbar 125 and crossbar 130 to stop all traffic to and from cell 105. Additionally, upon detection of the receipt of packet A without packet B the coherency controller 320 in cell 110 also sends a message to stop communications between cell 105 and both crossbars 125 and 130.

Alternatively, the error handling can be implemented in hardware and/or firmware. For example, cell 105 may include the appropriate logic circuitry such that upon detection of the error in the transmission from cell 105 to crossbar 125 and/or crossbar 130, a control message is sent to both crossbars to halt all traffic addressed to cell 105. In the hardware implementation, upon detection of a fatal error, the port enters an error handling mode where the port drops all packets which are not control and status register access packets. When the fatal error is resolved, software reenables the acceptance of all packets.

Assuming an initial communications fault between cell 105 and cell 110 the links between cell 110 and crossbars 125 and 130 must be reinitialized and the arbitration associated with the crossbar's port to cell 110 must be reset. In order to reinitialize the link between cell 110 and crossbars 125 and 130, all messages or all traffic must be stopped between these devices, i.e., cell 110 and the two crossbars. Again, both software and hardware implementations of the invention described ensure that all traffic is stopped between cell 110 and crossbars 125 and 130. The arbitration history for crossbars 125 and 130 is reset simultaneously with the reinitialization of the link between cell 110 and the crossbars.

In a preferred embodiment of the invention an ARB_RESET command is used to reset the port arbitration history registers. This arbitration history reset is done as part of a fatal error recovery routine in order to regain lock step between the two crossbar elements. Performing the arbitration history reset at the same time as reinitializing the link between the affected cell and the crossbar elements guarantees that both arbitration schemes within the crossbars are again in lock-step, i.e., synchronized.

Among the advantages of the present invention is that if processor 340 of cell 115 is in the process of transmitting information or communicating with processor 345 of cell 120, the reinitialization of the link between crossbars 125 and 130 with cells 105 and 110 does not affect that communication. Processor 340 of cell 115 can still communicate packet C (the first 36 bits of data) via coherency controller 350 of cell 115 via link 355 to crossbar 125 and via link 360 to coherency controller 365 of cell 120. The corresponding packet D (the second 36 bits of data) can also be sent from processor 340 of cell 115 to coherency controller 350 of cell 115 via link 370 to crossbar 130 and via link 375 to coherency controller 365 of cell 120. Again coherency controller 365 of cell 120 will combine packets C and D to regenerate the original message which is then sent to processor 345 of cell 120. The reinitialization of the link between cell 105 and crossbars 125 and 130 does not effect the transmission of data between cells 115 and 120. Similarly, the reinitialization and reset of arbitration history between cell and crossbars 125 and 130 does not affect the transmission of information from cell 115 to cell 120.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A data switch for communicating data messages in the form of multibit data units segmented into a plurality of multibit data subunits, said data switch comprising:
   a plurality of switching units, each switching unit having a plurality of ports to communicate said multibit data subunits;
   prioritization logic configured to initiate a transfer of data messages between said ports in response to a category of said data messages;
   a memory storing a history of categories of data message transfers; and
   a controller responsive to a reset condition to disable a communication between affected ones of said ports and clear said history.

2. The data switch according to claim 1 wherein said switching units comprise respective crossbars.

3. The data switch according to claim 1 wherein said prioritization logic is responsive to an ordering of message categories transferred to initiate a transfer of message categories least recently transferred prior to initiating a transfer of message categories most recently transferred.

4. The data switch according to claim 1 wherein said history of categories of data message transfers includes an indication of categories of said data messages most recently transferred through said switch.

5. The data switch of claim 1 wherein said category is a flow control class of said data message.

6. A processing system comprising:
   a plurality of processor-based cells, each including a controller configured to communicate data messages in discrete, multibit data units, each of said data units segmented into a plurality of multibit data subunits for parallel transmission to and from said controller over respective distinct transmission paths, said controller configured to recombine received ones of said subunits into a corresponding one of said multibit data units and to identify an error condition in response to a nonreceipt of one of said subunits required to complete a corresponding one of said multibit data units; and
   a switch including a plurality of switching units, each switching unit having a plurality of ports connected by said distinct transmission paths to respective ones of said controllers to communicate said multibit data subunit with said processor-based cells, said switch responsive to said error condition for initiating a resynchronization action.

7. The processing system according to claim 6 wherein said switch includes message prioritization logic configured to initiate a transfer of data messages between said ports in response to a category of said data messages.

8. The processing system according to claim 7 wherein said prioritization logic is responsive to an ordering of message categories transferred for initiating a transfer of message categories least recently transferred prior to initiating a transfer of message categories most recently transferred.

9. The processing system according to claim 7 wherein said switch further includes a memory configured to maintain a history of said data messages and said message prioritization logic is further responsive to said history for initiation of said transfer of data messages between said ports.

10. The processing system according to claim 9 wherein said history includes an indication of the categories of said data messages most recently transferred through said switch.

11. The processing system according to claim 10 wherein said resynchronization action includes halting communications between affected ones of said ports and resetting a portion of said history relating to said affected ports.

12. The processing system according to claim 11 wherein said prioritization logic is configured to initiate a transfer of a data message category least recently transferred prior to a data message category more recently transferred by said switch.

13. The processing system according to claim 6 wherein each of said switching units comprises a crossbar.

14. The processing system according to claim 6 wherein ones of said ports corresponding to a respective one of said processor-based cells include error processing logic for detecting an error in said data messages.

15. A method of communicating data messages in the form of multibit data units, comprising the steps of:

segmenting each of the multibit data units into a plurality of multibit data subunits;

categorizing each of said data messages;

maintaining a history of data message transfers;

initiating a transfer of said multibit data subunits over separate, parallel paths;

identifying an error; and resetting said history in response to identification of an error in said identifying step.

16. The method according to claim 15 further comprising a step of disabling a transfer of said multibit data subunits in response to identification of an error in said identifying step.

17. The method according to claim 16 further comprising a step of enabling said transfer of said multibit data subunits in response to said resetting step.

18. The method according to claim 15 wherein said step of initiating includes controlling a switch fabric to connect source and destination devices for communicating said multibit data subunits over said separate parallel paths.

19. The method according to claim 15 further comprising a step of ordering the categories of data messages transferred wherein said step of initiating is responsive to said ordering to initiate a transfer of message categories least recently transferred prior to initiating a transfer of message categories most recently transferred.

20. The method according to claim 15 wherein said history includes an indication of categories of said data messages most recently transferred.

21. The method according to claim 15 wherein said step of identifying an error includes detection of a nonreceipt of one of said multibit data subunits.

22. The method of claim 15 wherein said categorizing comprises categorizing each of said data messages according to a flow control class of said data messages.

* * * * *